US012546009B2

(12) United States Patent
Neugebauer et al.

(10) Patent No.: US 12,546,009 B2
(45) Date of Patent: Feb. 10, 2026

(54) METHOD FOR PRODUCING A DIAPHRAGM FOR AN ULTRASONIC SENSOR, AND DIAPHRAGM FOR AN ULTRASONIC TRANSDUCER

(71) Applicant: Robert Bosch GmbH, Stuttgart (DE)

(72) Inventors: Eva-Maria Neugebauer, Pliezhausen (DE); Tobias Liebelt, Ludwigsburg (DE); Stefanie Boetticher, Stuttgart (DE); Markus Junker, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 700 days.

(21) Appl. No.: 17/781,748

(22) PCT Filed: Nov. 18, 2020

(86) PCT No.: PCT/EP2020/082457
§ 371 (c)(1),
(2) Date: Jun. 2, 2022

(87) PCT Pub. No.: WO2021/115740
PCT Pub. Date: Jun. 17, 2021

(65) Prior Publication Data

US 2023/0018337 A1 Jan. 19, 2023

(30) Foreign Application Priority Data

Dec. 11, 2019 (DE) ..................... 10 2019 219 391.9

(51) Int. Cl.
*C23C 22/78* (2006.01)
*C23C 22/34* (2006.01)
(Continued)

(52) U.S. Cl.
CPC .............. *C23C 22/78* (2013.01); *C23C 22/34* (2013.01); *C23C 22/73* (2013.01); *C23G 1/02* (2013.01); *G10K 9/20* (2013.01); *C23C 2222/20* (2013.01)

(58) Field of Classification Search
CPC ......... C23C 22/78; C23C 22/34; C23C 22/73; C23C 2222/20; C23C 22/82; C23G 1/02;
(Continued)

(56) References Cited

U.S. PATENT DOCUMENTS 4,394,232 A * 7/1983 Exalto .................... C23G 1/125
205/706
2010/0213793 A1 8/2010 Wehling et al.
(Continued)

FOREIGN PATENT DOCUMENTS

CN 102963060 A * 3/2013
CN 108866531 A 11/2018
(Continued)

OTHER PUBLICATIONS

International Search Report for PCT/EP2020/082457, Issued Feb. 8, 2021.

*Primary Examiner* — Jonathan Johnson
(74) *Attorney, Agent, or Firm* — NORTON ROSE FULBRIGHT US LLP

(57) ABSTRACT

A method for producing a diaphragm for an ultrasonic sensor. In the method, a diaphragm body made of metal material is first provided. Next, an external surface region of the diaphragm body is degreased. The external surface region of the diaphragm body is then pickled. To pre-activate the subsequently applied second passivation layer, a first passivation layer is also deposited on the external surface region as a first layer.

13 Claims, 3 Drawing Sheets

(51) Int. Cl.

| | |
|---|---|
| ***C23C 22/73*** | (2006.01) |
| ***C23G 1/02*** | (2006.01) |
| ***G10K 9/20*** | (2006.01) |

(58) Field of Classification Search

CPC . C23G 1/00; C23G 1/125; G10K 9/20; G10K 9/00; B05D 3/102; B05D 7/14; B05D 1/02; B05D 1/18; B05D 2202/25; B05D 2503/00; B05D 2504/00; B05D 7/57

See application file for complete search history.

(56) References Cited

U.S. PATENT DOCUMENTS

| | | | | |
|---|---|---|---|---|
| 2012/0113758 | A1* | 5/2012 | Wehling | G10K 9/20 427/327 |
| 2014/0217478 | A1 | 8/2014 | Rothberg et al. | |
| 2015/0225856 | A1* | 8/2015 | Roth | C23C 22/07 428/447 |
| 2022/0007533 | A1* | 1/2022 | Wu | C25D 13/04 |

FOREIGN PATENT DOCUMENTS

| | | | | |
|---|---|---|---|---|
| DE | 102007043479 | A1 | 3/2009 | |
| DE | 102009034418 | A1 | 1/2011 | |
| DE | 102009039887 | A1 | 3/2011 | |
| EP | 2907894 | A1 | 8/2015 | |
| EP | 3498890 | A1 * | 6/2019 | C23G 1/00 |
| JP | 2016505707 | A | 2/2016 | |
| JP | 2019090109 | A | 6/2019 | |
| WO | 2013065093 | A1 | 5/2013 | |
| WO | WO-2019000451 | A1 * | 1/2019 | |

* cited by examiner

METHOD FOR PRODUCING A DIAPHRAGM FOR AN ULTRASONIC SENSOR, AND DIAPHRAGM FOR AN ULTRASONIC TRANSDUCER

FIELD

The present invention relates to a method for producing, in particular for coating, a vehicle component, and to a diaphragm for an ultrasonic sensor.

German Patent Application No. DE 10 2009 034 418 A1 describes a method for producing a diaphragm for an ultrasonic sensor, in which, to improve the adhesion of a transparent acrylic powder layer, a passivation layer is applied to an external surface region of the diaphragm.

Against that background, the object of the present invention is to develop both a method for producing, in particular for coating, a vehicle component, and a diaphragm for an ultrasonic sensor and a diaphragm for an ultrasonic sensor in which a larger selection of subsequent layers can be arranged on the diaphragm.

SUMMARY

This object may be achieved by providing a method for producing, in particular for coating, a vehicle component in accordance with the present invention. In particular, the vehicle component should be understood as a component of the vehicle that is open to the external surroundings of the vehicle. Examples of this include trim sections or vehicle sensors arranged on the exterior of the vehicle. In accordance with an example embodiment of the present invention, in the method, the vehicle component comprising an external surface made of metal material is first provided. Next, the external surface region of the vehicle component is degreased. The external surface region of the vehicle component is then pickled. After that, a second passivation layer is applied to the external surface region of the vehicle component as a second layer. To pre-activate the subsequently applied second passivation layer, a first passivation layer is deposited on the external surface region as a first layer, in particular using hexafluorotitanic acid. The first passivation layer has a seeding effect on the pickled external surface and promotes the growth of the subsequently deposited second passivation layer. Consequently, the second passivation layer grows much more quickly on the first passivation layer, resulting overall in a passivation layer that is composed of the first and the second passivation layer. With this composite passivation layer, the surface energy can be adjusted in a targeted manner. In particular, the composite passivation layer has a surface energy of more than 70 mN/m. In the process, the disperse and polar proportions of the surface energy are adjusted such that it is possible to obtain stable adhesion of a larger selection of subsequent layers applied directly to the passivation layer, and thus excellent protection against corrosion. In this context, the disperse proportions in particular have a greater surface energy value than the polar proportions. In this regard, the polar proportions in particular have a surface energy of at least 25 mN/m and the disperse proportions have a surface energy of at least 45 mN/m. Preferably, a diaphragm for an ultrasonic sensor is produced, in particular coated, as a vehicle component. First, a diaphragm body made of metal material, for example aluminum, is provided. Next, an external surface region of the diaphragm body is degreased, and the degreased external surface region of the diaphragm body is then pickled. After that, to pre-activate the subsequently applied second passivation layer, the first passivation layer is deposited on the external surface region as a first layer. In the process, the first layer is deposited in particular using hexafluorotitanic acid.

In accordance with an example embodiment of the present invention, preferably, the pickling of the external surface region, in particular of the diaphragm body, and the depositing of the first passivation layer on the external surface region as the first layer are carried out simultaneously, in particular during pickling-passivation.

In accordance with an example embodiment of the present invention, preferably, a primer layer is applied to the second passivation layer as a third layer for protecting the metal material against corrosion. A primer layer of this kind is used as a prime coat for subsequently applied layers, but in this context it also has a protective action against corrosion of the metal material of the diaphragm body.

In accordance with an example embodiment of the present invention, preferably, in the pickling process, the degreased surface region is treated with a chromium-free pickle liquor, which is in particular based on hydrogen fluoride and/or dihydrogen sulfate and/or trihydrogen phosphate. This treatment can be carried out in a dipping process or alternatively in a spraying process. This kind of chromium-free pickle liquor is less harmful to health.

Preferably, a wet coating, which is in particular polyurethane-based, is also applied to the primer layer as a fourth layer. A wet coating of this kind has functional properties (e.g., resistance to chemicals and scratches) and esthetic properties (e.g., color and gloss). The wet coating is in particular a one-coat finishing coat as a final surface. Alternatively, the wet coating can also be a base coat having a clear-coat system applied thereto.

Further preferably, a powder coating is applied to the second passivation layer as a fifth layer. A powder coating of this kind also has functional properties (e.g., resistance to chemicals and scratches) and esthetic properties (e.g., color and gloss). As a further alternative, a two-component water-based coating is applied to the second passivation layer as a sixth layer.

The present invention further relates to a diaphragm for an ultrasonic transducer, comprising a diaphragm body made of metal material. In this case, in accordance with an example embodiment of the present invention, the diaphragm is produced in particular by way of the above-described method for producing, in particular for coating, a diaphragm for an ultrasonic sensor, in accordance with an example embodiment of the present invention. In this context, to pre-activate a second passivation layer, a first passivation layer is arranged directly on an external surface region of the diaphragm body as a first layer, which surface region has been pickled and in particular also degreased beforehand. Additionally, the second passivation layer is arranged directly on the first passivation layer. A passivation layer of this kind, composed of a first passivation layer and a second passivation layer, provides the advantage whereby a larger selection of layers can be arranged directly on the composite passivation layer.

In accordance with an example embodiment of the present invention, preferably, a primer layer is arranged on the passivation layer as a third layer for protecting the metal material against corrosion. A primer layer of this kind is used not only as a prime coat for subsequently applied layers, but in this context it also has a protective action against corrosion of the metal material of the diaphragm body. Preferably, the primer layer in this context is epoxy-based or polyurethane-based. In particular, it is a water-based two-component system. Further preferably, the primer layer has a layer thickness in a range from 30 μm to 40 μm. A wet coating layer is preferably arranged on the primer layer as a fourth layer.

In accordance with an example embodiment of the present invention, preferably, the diaphragm body has an outer surface and an inner surface. In this case, the outer surface is arranged in particular in the transmission direction of the ultrasonic signals of the ultrasonic sensor. In this regard, the inner surface of the diaphragm is in particular arranged toward an interior of a diaphragm pot of the ultrasonic sensor. The composite passivation layer comprising the first and the second passivation layer is on the external surface region of both the outer surface and the inner surface of the diaphragm. Owing to the stronger adhesive action of the composite passivation layer, the outer surface of the diaphragm body can thus be provided with different protective and colored layers. Due to the stronger adhesive action of the composite passivation layer, a piezoceramic can, for example, be secured on the inner surface of the diaphragm body more easily.

Preferably, the second passivation layer is configured as a zirconium silane compound or an organometallic compound. These compounds provide both strong protection against corrosion and sufficient adhesion promotion for the subsequent coating layers and/or for the adhesive of the piezo element to be glued on.

Preferably, when combined, the first and the second passivation layer have a layer thickness in a range from 30 nm to 100 nm, in particular a layer thickness in a range from 45 nm to 55 nm. The quicker growth of the second passivation layer on the first passivation layer therefore produces a composite passivation layer to which a larger selection of subsequent layers adheres. In particular, the bond to organic coats, for example anti-corrosion coating layers, is strengthened. In addition, the layer composed of the first and the second passivation layer has better protection against corrosion.

Further preferably, when combined, the first and the second and/or the third and/or the fourth layer have a total layer thickness of at most 120 μm. The functioning of the ultrasonic sensor is thus ensured.

Further preferably, a powder coating is arranged on the second passivation layer, in particular directly, as a fifth layer. Alternatively, a two-component water-based coating is preferably arranged on the second passivation layer, in particular directly, as a sixth layer.

Further preferably, the diaphragm body is configured as a diaphragm pot, in particular of the ultrasonic sensor. In this regard, the diaphragm pot has an oscillatory diaphragm surface that in particular forms a bottom of the diaphragm pot.

The present invention further relates to an ultrasonic sensor comprising the above-described diaphragm. The ultrasonic sensor is configured to emit and/or receive ultrasonic signals and can in particular be used for park assist systems in vehicles.

DETAILED DESCRIPTION OF EXAMPLE EMBODIMENTS

Figure 1:
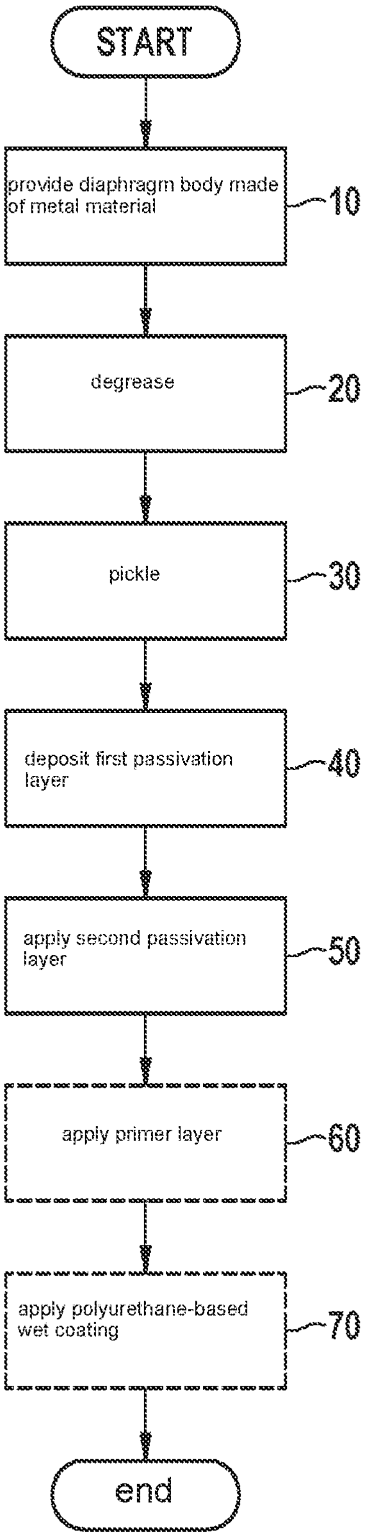
FIG. 1 shows a first specific example embodiment of a method for producing a diaphragm for an ultrasonic sensor as a vehicle component.

FIG. 1 shows a specific embodiment of a method for producing, in particular for coating, a vehicle component, in the form of a flowchart, in accordance with the present invention. To illustrate this better, the production of a diaphragm for an ultrasonic sensor is shown. In this context, in a first method step 10, a diaphragm body made of metal material, for example aluminum, is provided. In a subsequent method step 20, an external surface region of the metal diaphragm body is degreased. In this regard, the degreasing is carried out via treatment using alkaline dip degreasing, for example. Alternatively, the degreasing can also be carried out by acidic degreasing or spray degreasing. Once the surface has been degreased, the diaphragm body is rinsed to wash off the adherent bath solution. In a subsequent method step 30, the external surface region of the diaphragm body is pickled, so part of the external surface region of the diaphragm body is stripped away. When pickling the degreased surface region, in particular a chromium-free pickle liquor is used, for example based on hydrogen fluoride and/or dihydrogen sulfate and/or trihydrogen phosphate. The pickling process is carried out in particular in a dipping process or in a spraying process. In addition, the degreased surface region is deoxidized during the pickling. During deoxidation, the pickle liquor is adjusted such that the degreased surface region, which is alkaline after the degreasing process, is neutralized in the pickle liquor. In a subsequent method step 40, a first passivation layer is deposited on the external surface region as a first layer. In the process, the first passivation layer is deposited in particular using hexafluorotitanic acid. Next, the diaphragm body is rinsed again. The first passivation layer is for pre-activating the formation of a second passivation layer, which is applied to the first passivation layer in the subsequent method step 50. This produces a passivation layer composed of the first and the second passivation layer. Next, the diaphragm body is rinsed again and then dried. The method is then complete.

Optionally, method step 30 and method step 40 are carried out at the same time, in particular in a joint dipping bath in a pickling-passivation step.

In an optional method step 60 following method step 50, a primer layer is furthermore applied to the second passivation layer as a third layer for protecting the metal material of the diaphragm body against corrosion. In another optional method step 70, an in particular polyurethane-based wet coating is applied to the primer layer as a fourth layer. The wet coating is in particular a one-coat finishing coat as a final surface. Alternatively, the wet coating can also be a base coat having a clear-coat system applied thereto.

Figure 2A:
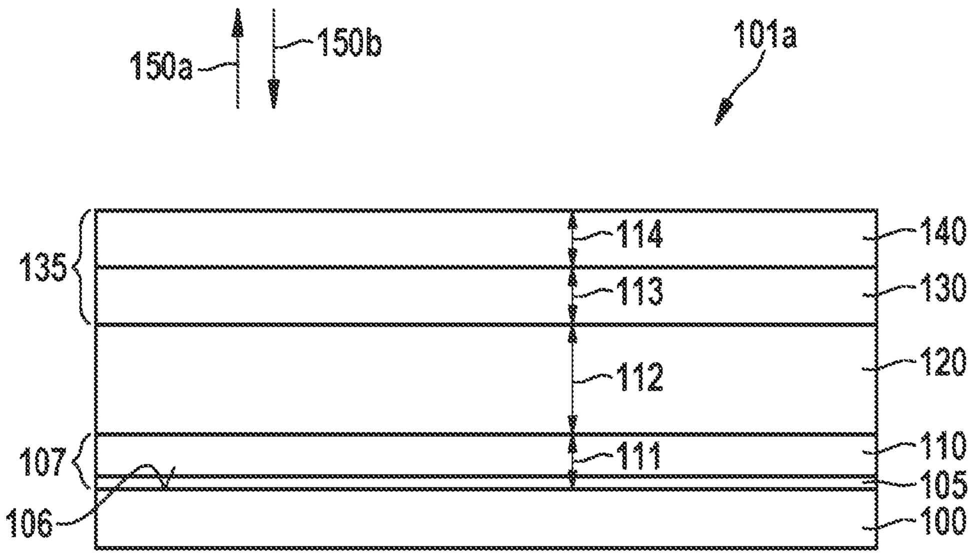
FIG. 2A shows a first specific example embodiment of a diaphragm for an ultrasonic transducer, comprising a diaphragm body made of metal material.

FIG. 2A schematically shows a diaphragm 101*a* for an ultrasonic transducer, comprising a diaphragm body 100 made of metal material. The diaphragm body 100 is configured as an oscillatory diaphragm surface made of metal material, in particular of aluminum. This figure schematically shows ultrasonic signals 150*a* emitted by the diaphragm body 100 and ultrasonic signals 150*b* received by it. A first passivation layer 105 is arranged on an external, pickled surface region 106 of the diaphragm body 100. This first passivation layer 105 is for pre-activating crystal formation of a second passivation layer 110 arranged directly on the first passivation layer 105. This results in a passivation layer 107 composed of the first passivation layer 105 and the second passivation layer 110. In this case, the second passivation layer 110 is configured as a zirconium silane compound. Alternatively, the second passivation layer 110 can also be configured as an organometallic compound. In this embodiment example, the passivation layer 107 composed of the first 105 and the second 110 passivation layer has a layer thickness 111 of substantially 40 nm.

In this first embodiment example of a diaphragm 101*a* for an ultrasonic transducer, comprising a diaphragm body 100, a primer layer 120 is arranged on the second passivation layer 110 as a third layer for protecting the metal material of the diaphragm body 100 against corrosion. In this case, this primer layer is epoxy-based. Alternatively, the primer layer can also be polyurethane-based. In this embodiment example, the primer layer 120 has a layer thickness 112 in a range from 30 μm to 40 μm.

Furthermore, in this first embodiment example, a wet coating layer 135 composed of a base-coat layer 130 and a clear-coat layer 140 is applied to the primer layer 120. In this case, the base-coat layer 130 has a layer thickness 113 in a range from 10 to 25 μm. In this case, the clear-coat layer 140 has a layer thickness 114 in a range from 25 to 35 μm.

Figure 2B:
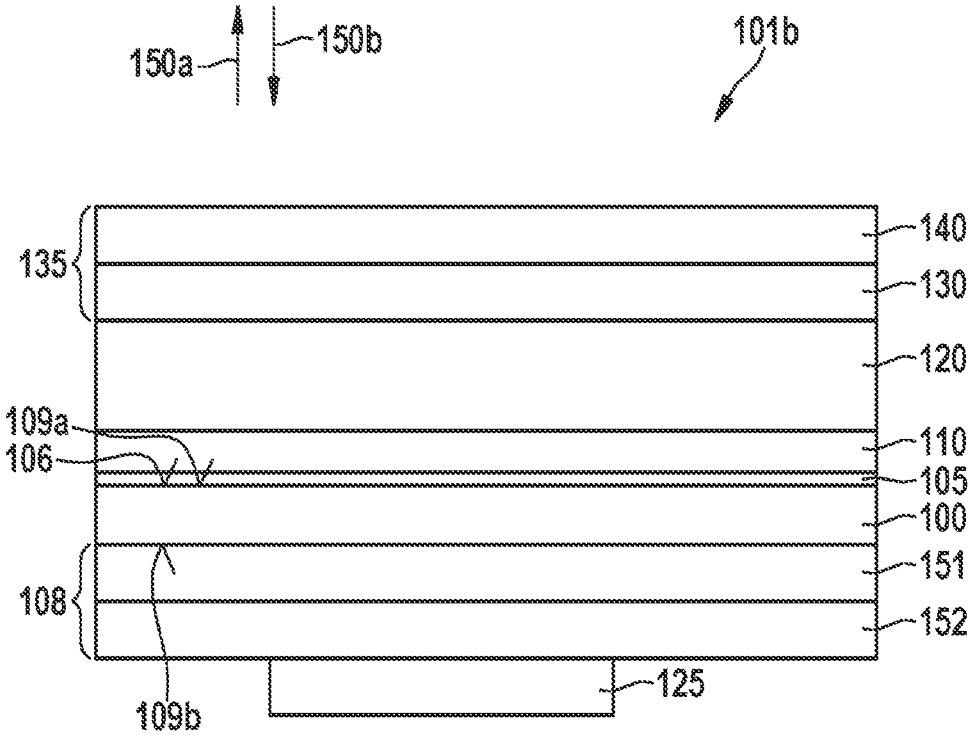
FIG. 2B shows a second specific example embodiment of a diaphragm for an ultrasonic transducer, comprising a diaphragm body made of metal material.

FIG. 2B schematically shows a second embodiment example of a diaphragm 101*b* for an ultrasonic transducer, comprising a diaphragm body 100 made of metal material. In this case, the same layers as in the first embodiment example are arranged on an outer surface 109*a* of the diaphragm body 100. By contrast with the first embodiment example, in this case a further first passivation layer 151 is arranged on an inner surface 109*b* of the diaphragm body 100. In addition, a further second passivation layer 152 is applied to the further first passivation layer 151, such that a piezoceramic 125 adheres better to the further passivation layer 108 composed of the first 151 and the second 152 passivation layer.

Figure 2C:
FIG. 2C shows a third specific example embodiment of a diaphragm for an ultrasonic transducer, comprising a diaphragm body made of metal material.

FIG. 2C shows a third embodiment example of a diaphragm 101*c* for an ultrasonic transducer, comprising a diaphragm body 100 made of metal material. By contrast with the previous embodiment examples, in this case a powder coating layer 160 is arranged directly on the second passivation layer 110.

Figure 2D:
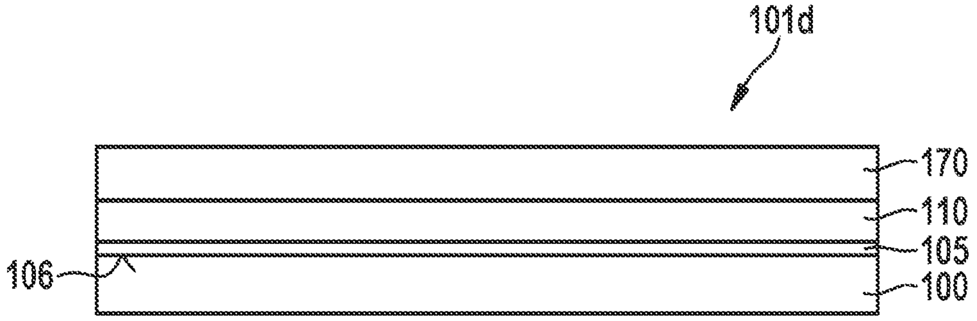
FIG. 2D shows a fourth specific example embodiment of a diaphragm for an ultrasonic transducer, comprising a diaphragm body made of metal material.

FIG. 2D shows a fourth embodiment example of a diaphragm 101*d* for an ultrasonic transducer, comprising a diaphragm body 100 made of metal material. By contrast with the previous embodiment examples, in this case a two-component water-based coating layer 170 is arranged directly on the second passivation layer 110.

Figure 3:
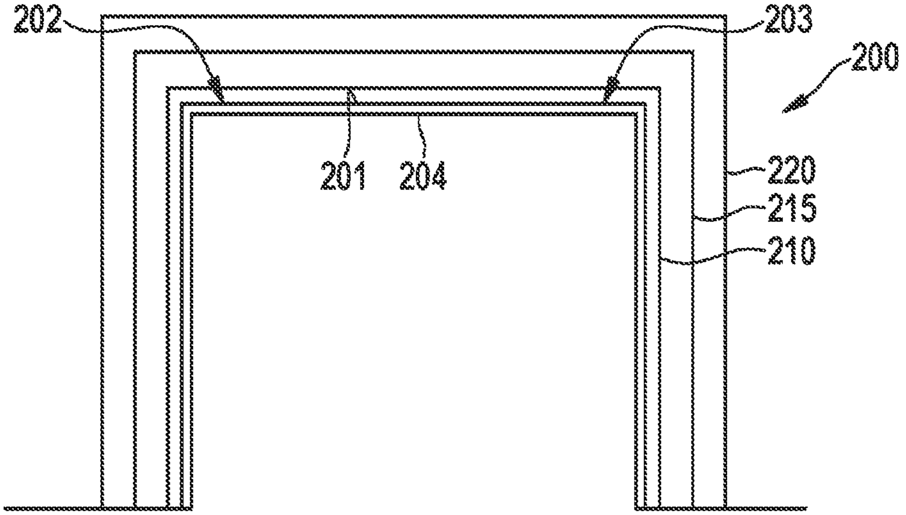
FIG. 3 shows a specific example embodiment of a diaphragm pot of an ultrasonic sensor comprising a diaphragm.

FIG. 3 shows a diaphragm pot 201 as a diaphragm body of a diaphragm 200 of an ultrasonic sensor. In this case, the bottom 204 of the diaphragm pot 201 has an oscillatory diaphragm surface. When in the installed state on an external panel part of a vehicle, this oscillatory diaphragm surface is arranged in an unobstructed manner on the outside of the vehicle.

The diaphragm pot 201 is made of a metal material, in particular aluminum. In this case, an external, pickled surface region 203 of an outer surface 202 of the diaphragm pot 201 is directly coated with a first passivation layer 210 as a first layer. This first passivation layer 210 is for pre-activating a second passivation layer 215, which is again deposited directly on the first passivation layer 210 as a second layer. A primer layer 220 is again deposited directly on the second passivation layer 215 as a third layer for protecting the metal material of the diaphragm pot 201 against corrosion.

What is claimed is:

1. A method for producing at least one vehicle component, the method comprising the following steps:

providing the vehicle component including an external surface made of metal material;

degreasing the external surface region of the vehicle component;

pickling the external surface region of the vehicle component;

applying a second passivation layer to the external surface region of the vehicle component as a second layer;

wherein, to pre-activate the subsequently applied second passivation layer, a first passivation layer is deposited on the external surface region as a first layer, using hexafluorotitanic acid, wherein the first and second passivation layers together form a composite passivation layer having a surface energy with both disperse and polar components, the disperse component being greater than the polar component.

2. The method as recited in claim 1, wherein the vehicle component produced is a diaphragm for an ultrasonic sensor.

3. The method as recited in recited claim 1, wherein the pickling of the external surface region and the depositing of the first passivation layer on the external surface region as the first layer are carried out simultaneously, in a pickling-passivation step.

4. The method as recited in claim 1, wherein a primer layer is applied to the second passivation layer as a third layer for protecting the metal material against corrosion.

5. The method as recited in claim 1, wherein, in the pickling, the degreased external surface region is treated with a chromium-free pickle liquor including hydrogen fluoride and/or dihydrogen sulfate and/or trihydrogen phosphate, in a dipping process or in a spraying process.

6. The method as recited in claim 4, wherein a wet coating containing polyurethane is applied to the primer layer as a fourth layer.

7. The method as recited in claim 1, wherein the vehicle component is a diaphragm having a diaphragm body made of the metal material, and wherein the external surface region of the diaphragm body treated in the pickling step is the pickled external surface region.

8. The method as recited in claim 7, wherein the diaphragm body has an outer surface and an inner surface, and the first and the second passivation layers are arranged on the external surface region of the outer surface and of the inner surface of the diaphragm body.

9. The method as recited in claim 4, wherein the primer layer includes epoxy or polyurethane.

10. The method as recited in claim 1, wherein the second passivation layer has a zirconium silane compound or an organometallic compound.

11. The method as recited in claim 1, wherein, when combined, the first and the second passivation layers have a layer thickness in a range from 30 nm to 100 nm.

12. The method as recited in claim 4, wherein the primer layer has a layer thickness in a range from 30 μm to 40 μm.

13. The method as recited in claim 3, wherein a diaphragm body of the diaphragm is formed as a diaphragm pot of the ultrasonic sensor, the diaphragm pot having an oscillatory diaphragm surface.

* * * * *